US006959930B2

(12) United States Patent
Wood et al.

(10) Patent No.: US 6,959,930 B2
(45) Date of Patent: Nov. 1, 2005

(54) COMBINATION OIL SCRAPPER RING/GAS SEAL ASSEMBLY

(75) Inventors: Michael H. Wood, Lou., KY (US); Ernest B. McCurdy, Lou., KY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 247 days.

(21) Appl. No.: 10/438,474

(22) Filed: May 15, 2003

(65) Prior Publication Data

US 2004/0227301 A1 Nov. 18, 2004

(51) Int. Cl.[7] .................................................. F16J 9/12
(52) U.S. Cl. ...................... 277/434; 277/435; 277/460; 277/463; 277/489
(58) Field of Search ................................ 277/434–435, 277/459–466, 489, 492, 496–499

(56) References Cited

U.S. PATENT DOCUMENTS

| | | | | |
|---|---|---|---|---|
| 1,536,595 A | * | 5/1925 | Light et al. ................. | 277/546 |
| 1,655,853 A | * | 1/1928 | Badeker ...................... | 277/545 |
| 1,828,178 A | * | 10/1931 | Fox ............................. | 277/543 |
| 3,066,943 A | * | 12/1962 | Brenneke .................... | 277/462 |
| 3,305,241 A | * | 2/1967 | Hart ............................ | 277/547 |
| 3,670,383 A | | 6/1972 | Gavrun | |
| 3,698,054 A | | 10/1972 | Prasse | |
| 4,103,594 A | | 8/1978 | Geffroy | |
| 4,145,060 A | | 3/1979 | Stecher et al. | |
| 4,170,363 A | | 10/1979 | Bergman | |
| 4,289,322 A | * | 9/1981 | Traversari et al. .......... | 277/546 |
| 4,350,349 A | * | 9/1982 | McTavish ................... | 277/546 |
| 4,473,232 A | | 9/1984 | Umeha | |
| 4,629,198 A | | 12/1986 | Morsbach | |
| 4,706,971 A | | 11/1987 | Schirmer | |
| 4,741,543 A | | 5/1988 | Geoffroy | |
| 4,796,898 A | | 1/1989 | Bruers | |
| 5,474,307 A | | 12/1995 | De Biasse | |
| 6,116,204 A | | 9/2000 | Katsaounis | |
| 6,199,274 B1 | | 3/2001 | Preyer | |
| 6,286,837 B1 | * | 9/2001 | Humphrey ................. | 277/435 |
| 6,367,805 B1 | * | 4/2002 | Radcliffe et al. ........... | 277/343 |
| 6,419,234 B1 | | 7/2002 | Yu | |
| 6,439,578 B1 | * | 8/2002 | Radcliffe .................... | 277/489 |

OTHER PUBLICATIONS

Exhibit 1: Attached drawing of scraper ring assembly offered for sale in the U.S. more than one year prior to filing of U.S. application (D–4528).

\* cited by examiner

*Primary Examiner*—Anthony Knight
*Assistant Examiner*—Vishal Patel
(74) *Attorney, Agent, or Firm*—Liniak, Berenato & White, LLC (57) ABSTRACT

A ring assembly, including a first oil scraper ring, a center oil scraper ring and a gas seal ring, adapted for disposition in a single groove of a packing cup which can be stationarily mounted over and around a reciprocally movable piston rod of a gas compressor. The function of the assembly is to both scrape lubricating oil from the piston rod for return to one side of the cup and to provide a seal against gas leakage from an opposite side of the cup, both along the piston rod under the seal ring and between the seal ring and opposing sides of the center ring and groove to prevent mixing of gas with the oil and escape of gas from the compressor. The center ring features a tapered outer peripheral surface portion. An annular side loading element, which can be a garter spring, is mounted in compression around the center ring so as to bear against the tapered surface portion and against an adjacent side of the first ring. The element thus side loads the first ring, by urging it against one side of the groove and oppositely side loads the center ring and seal ring to force one against the other and to urge the seal ring tightly against an opposite side wall of the groove to effect a satisfactory gas seal. The first ring and center ring, together, provide three separate and axially spaced apart oil scraper edges.

27 Claims, 5 Drawing Sheets

COMBINATION OIL SCRAPPER RING/GAS SEAL ASSEMBLY

BACKGROUND OF THE INVENTION

This invention relates generally to rings disposed in a ring retaining groove of a packing cup which is stationarily mounted over and around a reciprocally movable piston rod of a gas compressor. More specifically, this invention relates to a series of three such rings, first and second ones of which have piston rod oil scraping functions and a third of which has a gas sealing function to prevent gas from one side of the ring series from mixing with and contaminating lubricating oil pooled on an opposite side of the ring series and to prevent gas from escaping the compressor to ambient atmosphere.

Broadly speaking, numerous different types of both oil scraper rings and gas seal rings have long been known and used in the prior art. Examples of oil scraper rings known in the prior art include those used on pistons as disclosed in U.S. Pat. No. 4,103,594 granted to R. Geffroy on Aug. 1, 1978 and U.S. Pat. No. 4,473,232 granted to G. Umeha et al. on Sep. 25, 1984. There are also examples of oil scraper rings used in the prior art to remove oil from reciprocally movable piston rods such as that disclosed in U.S. Pat. No. 4,170,363 granted to U. C. Bergman on Oct. 9, 1979. Similarly, gas seal rings have long been known and used in the prior of the rod and past the seal ring to prevent mixing of gas with crank case lubricating oil, which not only results in loss of the, gas but also results in contamination of the oil. In fact, the gas seal ring shown in the preferred embodiment of the subject invention is, in and of itself, an example of a common prior art seal ring used on compressor piston rods.

Further, there is at least one example known to us in the prior art wherein one or more gas seal rings has been employed together with an oil wiper ring in a single circumferentially extending, radially outwardly opening ring retaining groove in a piston of an internal combustion engine. See U.S. Pat. No. 5,474,307 granted to R. De Biasse et al. on Dec. 12, 1995. However, the sealing rings of the patented arrangement are of the gas pressure energized type which require a gas pressure in the base of the groove of sufficient magnitude to force the scraper and sealing rings outwardly to engage and properly seal against a cylinder wall. It would be desirable to provide an oil scraper ring/gas seal ring arrangement for disposition in a single ring retention groove wherein the rings are spring compressed and not dependent upon gas leaking into the groove in order to force the rings into functional engagement with the rod. This is especially the case where the mixing of lubricating oil and compressed gas is to be avoided.
especially the case where the mixing of lubricating oil and compressed gas is to be avoided.

It is therefore an object of the invention to provide a ring assembly for a reciprocally movable compressor piston rod which functions to both scrape oil from the piston rod and provide a gas seal between high pressure gas on one side of the assembly and lubricating oil on the other side, which assembly is disposed in a single ring retaining groove of a packing cup stationarily mounted over and around the compressor piston rod.

It is another object of the invention to provide an oil scraper ring/gas seal ring assembly for disposition in a single groove of a compressor packing cup wherein the seal ring depends entirely upon the compression force of a garter spring for sealing against a piston rod.

It is also an object of this invention to provide a novel oil scraper/gas seal ring assembly for a single groove comprising a first oil wiper ring located on an oil filled crankcase side of the groove, a center oil scraper ring disposed next to the first ring and gas seal ring disposed next to the center ring on a gas compressor side of the groove.

It is a further object of the present invention to provide such a novel ring assembly wherein the center ring features a diagonally tapered outer peripheral surface portion which permits a compression spring disposed thereover to bear against the tapered portion and an adjacent sidewall of the first ring so as to both compress the center ring against a piston rod and to side load the first ring and center ring to form a thermal ring expansion gap between the first ring and the center ring and to urge the center ring against the seal ring so as to provide effective gas seals between opposing sides of the center ring and seal ring and between opposing sides of the seal ring and the groove.

These and other objects, features and advantages of the present invention will become apparent to those skilled in the art from the following detailed description and attached drawings, upon, which, by way of example, only certain specific embodiments of the invention are shown.

DESCRIPTION OF THE PREFERRED EMBODIMENT

Figure 1:
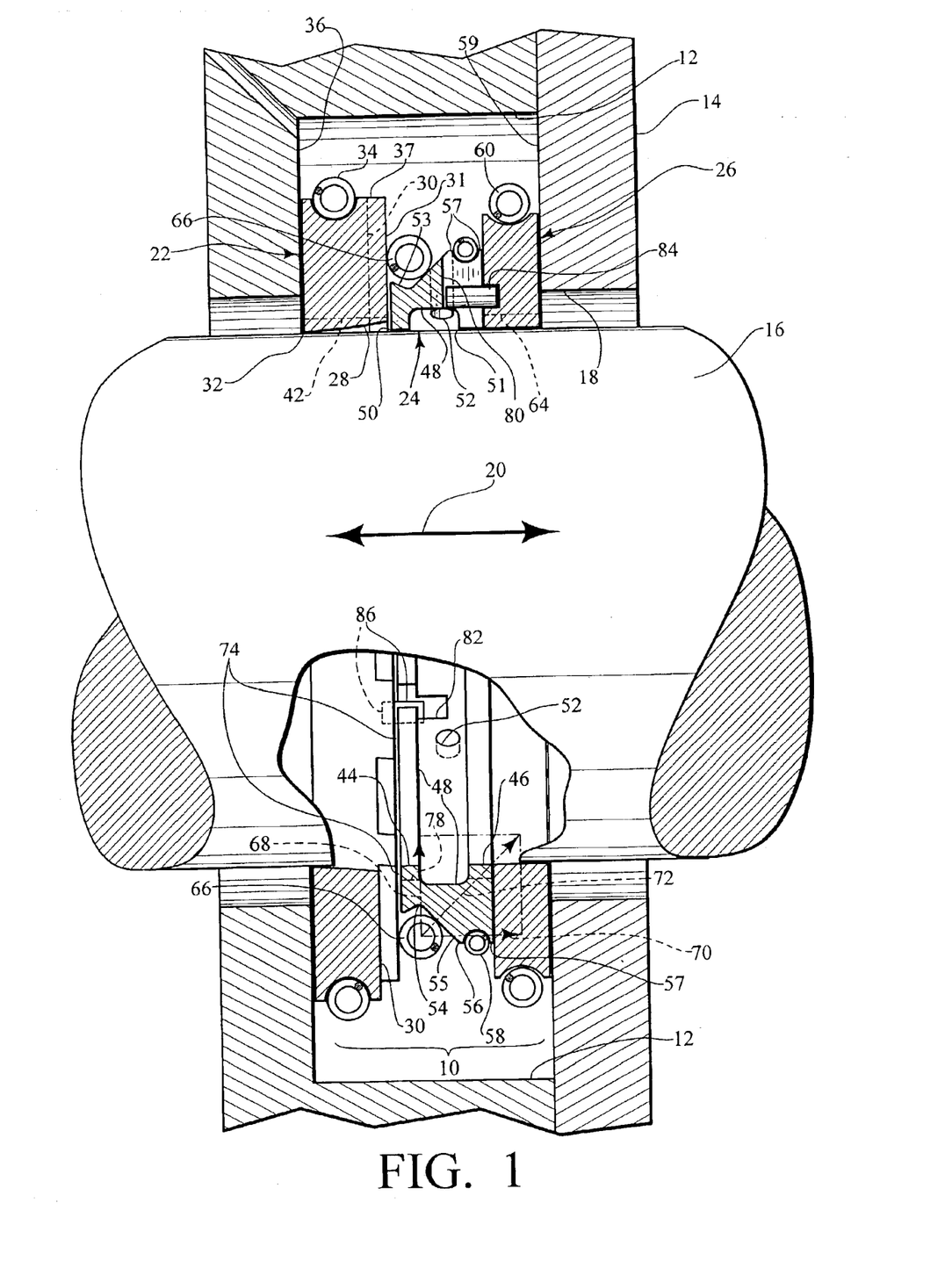
FIG. 1 shows a radial cross-section view of a packing cup having a ring retaining groove containing a novel oil scraper ring/gas seal ring assembly mounted on a piston rod of a gas compressor, thus illustrating a preferred embodiment of the invention.

Referring now to the drawing figures and, in particular, to FIG. 1, there is shown, in a preferred embodiment of the subject invention, a novel oil scraper-ring/gas seal ring assembly, generally designated 10, for disposition in a ring retaining groove 12 of a conventional packing cup 14, the packing cup being fixedly and stationarily mounted over and around a reciprocally movable piston rod 16 of a conventional gas compressor. Operative reciprocal movement of the piston rod 16 through a circumferentially spaced apart circular bore 18 of the cup 14 in the usual manner is represented in FIG. 1 by a two headed arrow 20. The assembly 10 includes a first wiper or scraper ring 22, a center wiper or scraper ring 24 and a conventional gas seal ring 26, each of the rings being designated generally by arrowed leader lines.

Figure 2:
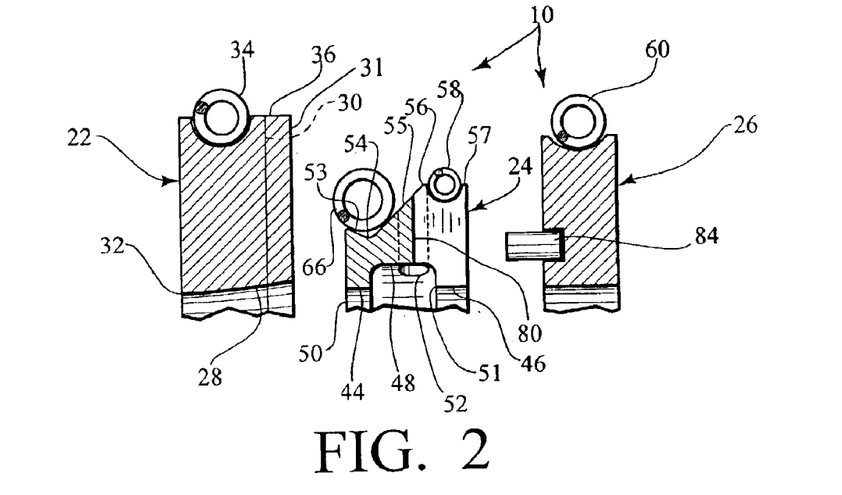
FIG. 2 shows an exploded view of portions of each of the rings in the assembly of FIG. 1.
Figure 3:
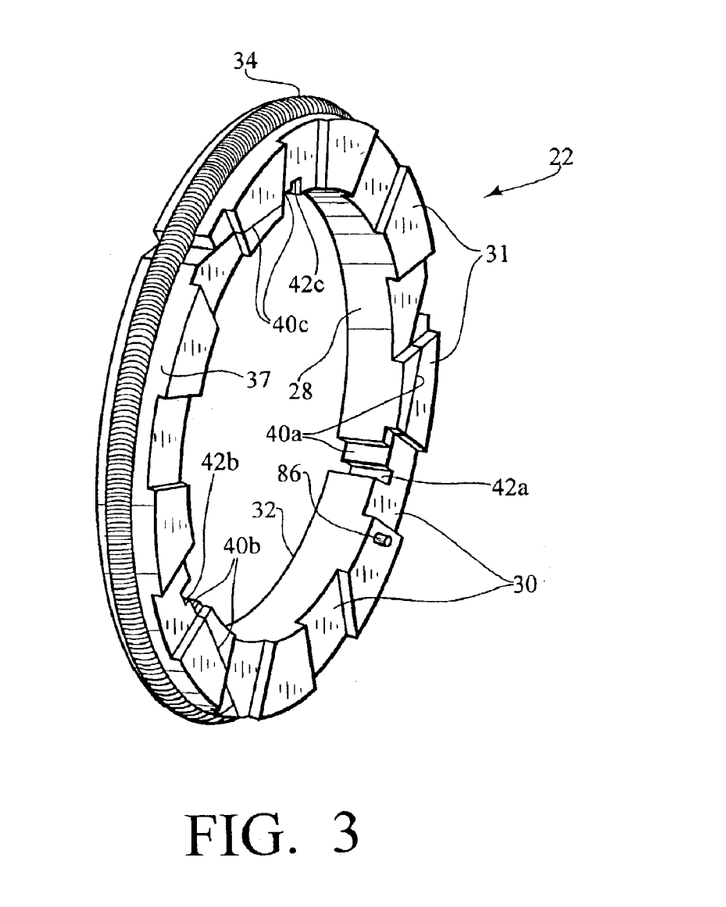
FIG. 3 shows a perspective view of a first oil scraper ring having a profiled bore and rotationally spaced apart oil drain channels on one broad side thereof, it being one of the rings of FIGS. 1–2.
Figure 4:
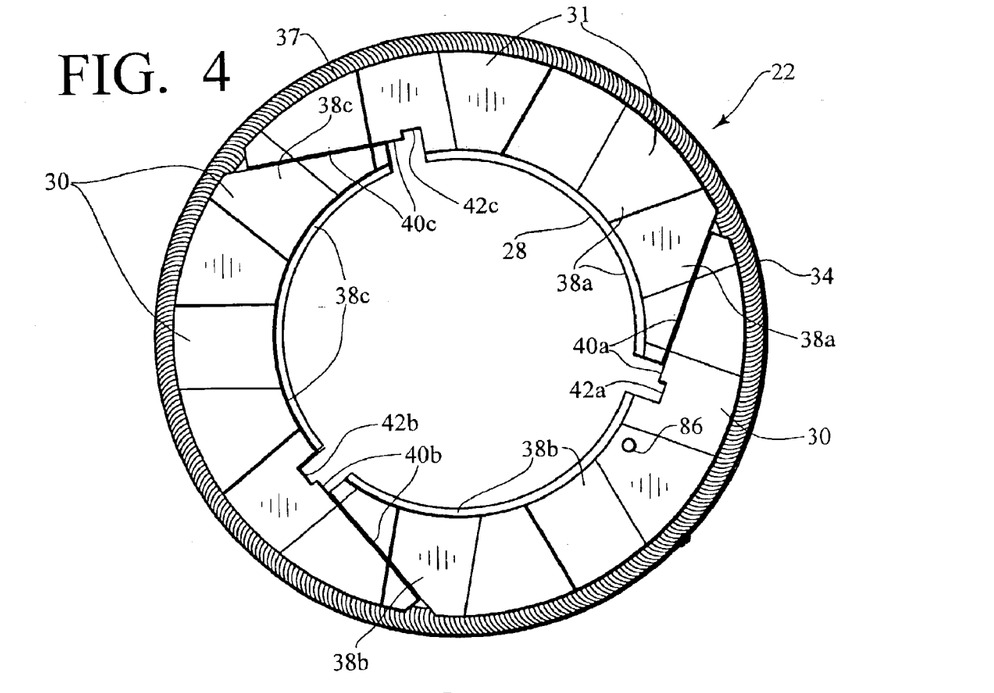
FIG. 4 shows an axial broad side view of the first scraper ring of FIGS. 1–3 as viewed from the right side in those figures.
Figure 5:
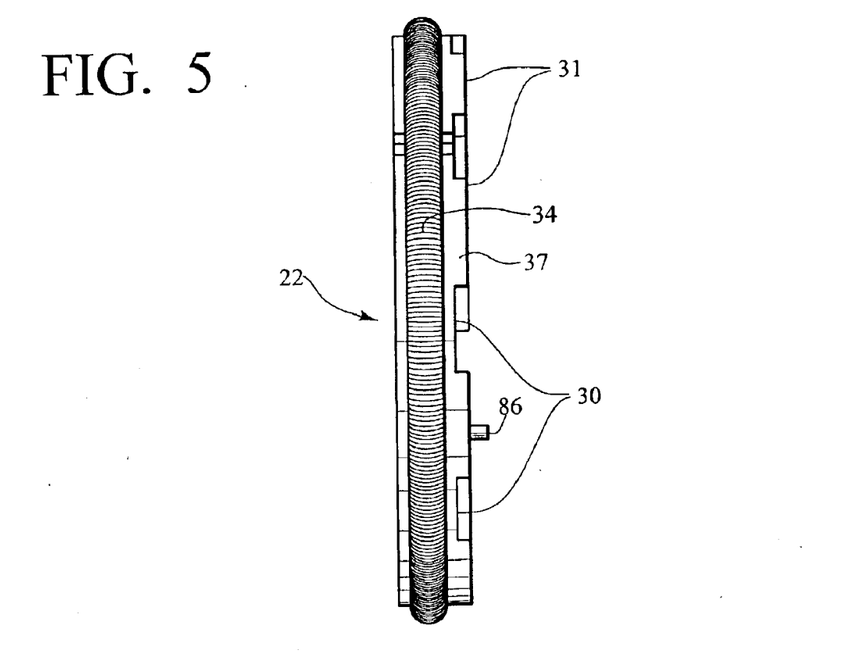
FIG. 5 shows an edge view of the first scraper ring of FIGS. 1–4.

The first scraper ring 22 contains a profiled central bore 28, as best seen in FIGS. 1–2, and a series of rotationally spaced apart, radially extending oil drain channels 30, as best seen in FIGS. 3–5. The drain channels 30 are formed in a broad side surface portion 31 of the first ring 22 which faces the center ring 24. The first ring 22 includes a circumferentially extending first oil scraper edge 32 on a broad side thereof which is opposite the broad side surface portion 31 which contains the drain channels 30. The first scraper edge 32 is urged against the piston rod 16 by a garter or compression spring 34 which is mounted around a suitably grooved surface portion of an outer periphery 37 of the first ring 22, the first scraper edge 32 thus being adapted for scraping oil off the piston rod 16 as the rod moves from left to right as shown by arrow 20 in FIG. 1. The first scraper edge 32 thus scrapes oil from the surface of the rod 16 at a first position aligned with a sidewall 36 of the groove 12 before it can enter the groove and discharges it away from the groove 12 and cup 14 in a direction opposite to the direction of travel of the rod, to the left as viewed, while oil scraping is in progress. As best seen in FIG. 4, the first ring 22 is formed of a series of three arc shaped ring segments 38a, 38b and 38c in the present example. Adjacent ends of the segments 38a, 38b and 38c each meet to form a butt/tangent joint, as at 40a, 40b and 40c as seen in FIGS. 3–4. Butt portions 42a, 42b and 42c of these joints each extend fully across radially inner surface portions of the first ring 22, radially, inwardly open against the piston rod 16 and extend axially, from left to right, as viewed, to open in a different one of the oil drain channels 30.

Figure 6:
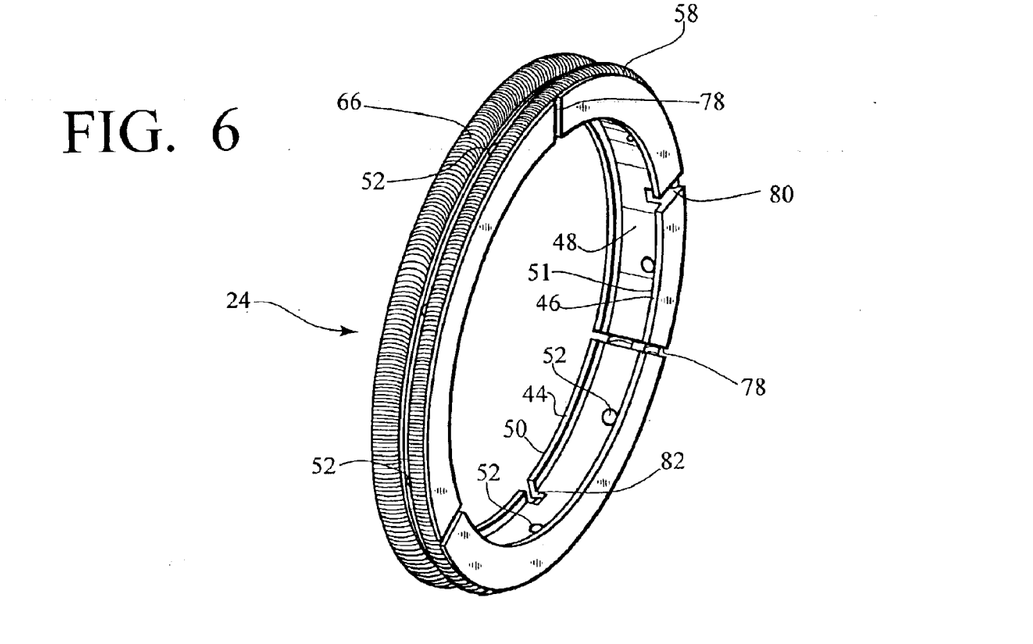
FIG. 6 shows a perspective view of a center oil scraper ring, it being another of the rings of the assembly of FIGS. 1–2.

The center oil scraper ring 24, as shown in FIGS. 1–2 and 6, contains two circumferentially extending and axially spaced apart oil scraper legs 44 and 46 which are separated by a circumferentially extending recess 48. The leg 44 contains a second oil scraper edge 50 which bears against the piston rod 16, at a second position on one side of the ring 24, adjacent the first ring 22, to scrape oil therefrom and discharge it back into the oil drain channels 30 formed in a surface portion of the adjacent side 31 of the first ring 22. Thus, the second oil scraper edge 50 tends to scrape oil from the piston rod 16 which was missed by the first edge 32, due to it laying along the rod under the grooved butt portions 42a, b and c of the joints 40a, b and c in the first ring 22, as the piston rod 16 moves from left to right as viewed. The leg 46 contains a third oil scraper edge 51 which scrapes away residual oil from the piston rod 16 at a third position as the rod moves from left to right as viewed, and discharges it back into the recess 48 where it can drain through a series of radially extending and rotationally spaced apart oil drain passageways 52 to an outer periphery of the ring 24 and, ultimately, out of the groove 12 back to its point of origin.

The center ring 24 features an outer periphery having a generally V-shaped circumferentially extending notch which includes a relatively short axially extending tapered portion 53 which extends diagonally inwardly and axially from the outside surface of the leg 44 to a first intersection 54 with a relatively long axially extending tapered portion 55 which extends radially outwardly and axially from the first intersection to a second intersection 56 where it meets a generally constant diameter outer peripheral side portion 57 which is suitably grooved to contain a garter spring 58 as shown in both FIGS. 1–2. The short leg portion 53 extends generally across and in registry with the scraper leg 44, the long leg portion 55 extends over its entire length in registry with and at least partially across the recess 48, and the outer side portion 57 extends across a small side portion of the recess 48 and the entire axial dimension of the scraper leg 46. The intersection 54 forms the base of a notch in which a side loading element or garter spring 66 can rest when the center ring 24 is separate from the rings 22 and 26, as before the assembly 10 is placed in the groove 12 of the cup 14.

At this point, it should be pointed out that the sum of the axial dimensions of the three rings 22, 24 and 26 must be less than the axial dimension of the ring retaining groove 12 for all operating temperatures of the assembly 10 in the compressor up to and including the maximum operating temperature to be encountered, by the rings. In practice, the differences in axial dimension between the total axial dimension of the three rings 22, 24, and 26 and that of the groove should be from about 0.003 inches up to about 0.009 inches at standard room temperature, depending, in part, on the relative size of the assembly 10, in part, on the coefficient of thermal expansion of the rings and, in part, on the maximum operating temperatures to be encountered. Such an axial dimension difference at room temperature will be necessary to permit the rings to expand as they heat up following a cold start up of the compressor without causing them to bind or lock up between the groove sidewall 36 and an opposite groove sidewall 59. See FIG. 1. Such a lock up will interfere with spring loading of the rings 22, 24 and 26 upon the piston rod 16 causing their intended functions to be severely reduced in effectiveness, if not completely destroyed.

Figure 7:
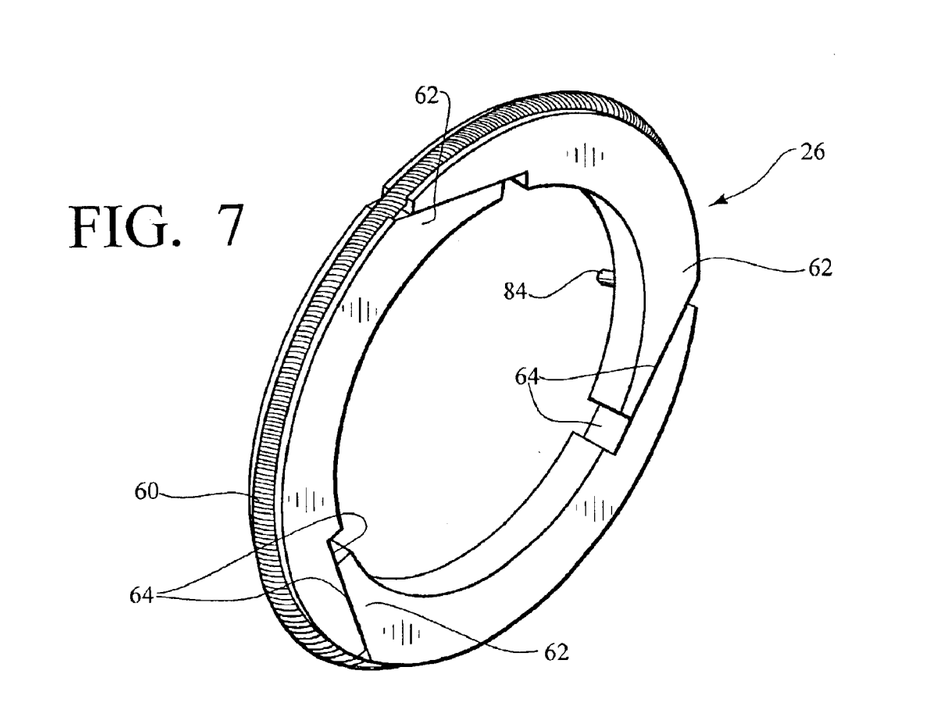
FIG. 7 shows a perspective view of a conventional gas seal ring, it being yet another of the rings of the assembly of FIGS. 1–2.

The gas seal ring 26 is the third and last ring in the assembly 10, may be of conventional type and is disposed in the ring groove 12 between the center ring 24 and the groove sidewall 59, opposite the groove sidewall 36 against which the first ring 22 is positioned. The function of the seal ring 26 is to prevent gas as, for example, from a compressor cylinder located to the right side of the cup 14, as viewed, from leaking into the groove 12 so as to become mixed with and contaminate oil which is pooled on the left side of the cup 14 and used to lubricate a crankshaft of a diesel engine or other prime mover of the compressor piston rod 16 and so as to escape the compressor to ambient atmosphere. The seal ring 26, as shown in FIGS. 1–2 and 7, employs a garter spring 60 which is suitably mounted in a groove formed about the outer periphery thereof, to resiliently compress the seal ring against the piston-rod 16. As in the case of the first ring 22, the seal ring 26 comprises a series of arc shaped segments 62, there being a total of three in the present example, adjacent ends of which meet to form a series of butt/tangent joints 64. See FIG. 7.

Referring, once again, to the center ring 24 of FIGS. 1–2 and 6, and, especially, to FIG. 1, an extension type garter spring 66 is employed which is wedged between the tapered peripheral surface portion 55 of the V-notch of the ring 24 and the adjacent broadside 31 of the first ring 22. A radially inwardly directed component of the compression force of the spring 66 is represented by a force component or vector 68. There is also an axially directed force component or vector represented by force component or vector 70. The vector sum of the force components 68 and 70 produces a diagonally inwardly directed resultant force component or vector 72. Due to the presence of the axially directed force component 70 and its equal and opposite reaction force (not visually represented) against the side of the first ring 22, the center ring 24 is side loaded so as to be shoved axially away from the first ring and against the seal ring 26 to produce a gas tight seal between the center ring and seal ring and between the seal ring and the groove sidewall 59. The garter spring 60 also assures a gas tight seal of the seal ring 26 against the piston rod 16. At the same time, the axial reaction force, operating in a direction opposite the axial force component 70, shoves the first ring 22 away from the center ring 24 and tightly against the groove sidewall 36 to assure that the first scraper edge 32 will always be against the groove sidewall 36 when scraping the piston rod 16.

Accordingly, a small circumferentially extending thermal expansion gap 74 is maintained between the broadside surface 31 of the first ring 22 and the opposing side of the center ring 24 for all temperatures of the assembly 10 to be encountered, at least up to and including the highest anticipated operating temperatures reaches by the rings 22, 24 and 26 during service in the compressor. However, as the operating temperature of the assembly 10 increases, the rings 22, 24 and 26 will tend to expand axially in the groove 12 such that the axial dimension of the gap 74 will tend to decrease. As the gap 74 narrows with ambient temperature increases, the garter spring 66 tends to slide radially outwardly against the adjacent broadside of the first ring 22 and will, at the same time, migrate axially to the right of the intersection 54 and radially outwardly along the diagonally extending tapered surface portion 55, all in opposition to the compression force 68.

At or about the highest operating temperature of the assembly 10 in the operating compressor, it is highly desirable that the resultant force component 72 be directed, as nearly as practical, from a geometric center of the spring 66 through a radially inner corner of the ring 24 which is opposite the diagonally extending surface portion 55, i.e. through the radially inner right hand corner of the ring 24, as viewed. Should the spring 66 be positioned radially too far outwardly on the diagonally extending surface portion 55 under normal operating temperatures, such that the resultant force component 72 passes through the right sidewall of the ring 24, radially outwardly from the right hand corner, as viewed, the center ring will have a tendency to rock back and forth on the legs 44 and 46 and limit the ability of the ring to perform its scraping functions and to possibly disrupt the gas seal between the center ring 24 and the seal ring 26 and between the leg 46 of the center ring and the piston rod 16. For temperatures of the assembly 10, as at cold compressor start up and during the warm up period prior to reaching operating temperature levels, wherein the resultant force component 72 may pass through the bore of the ring 24 to the left of the right hand corner, as viewed, the garter spring 58 tends to provide a sufficient minimal compression in the radial direction of the leg 46 upon the piston rod 16 to prevent undesired rocking movement. It has been found that the diagonally extending outer peripheral surface portion 55 of the ring 24 functions satisfactorily when forming an angle with the axis of the ring of about 45 degrees, although numerous factors could come into play to make a different angle satisfactory, such factors including the maximum temperature variations in the rings, which would dictate the amount of movement of the spring 66 along the tapered surface portion 55, the diameter of the spring 66, axial and radial dimensions of the ring 24 and other geometric factors.

The oil drain passageways 52 in the center ring 24 should be axially positioned so as to open on the outer periphery of the ring between the garter spring 66, when at its radially outermost operating position on the tapered surface portion 55, and the garter spring 58. This positioning will ordinarily require the passageways 52 to be axially offset to one side of the recess 48, as can be seen in FIGS. 1–2 and 6, due to the substantial difference in a diameter between the springs 58 and 66. The center ring 24 is also constructed of a series of arc shaped segments 76, of which there are three in the present example as shown in FIG. 6. Adjacent ends of the segments 76 each meet to form a standard of butt joint 78. The center ring 24 also contains a seal ring pin socket 80 opening onto one broad side thereof facing the seal ring 26, and a first scraper ring pin socket 82 opening onto an opposite broadside thereof facing the first ring 22. The socket 80 receives a rotational alignment pin 84 projecting from an adjacent broad side of the seal ring 26. See FIGS. 6–7. The socket 82 receives a rotational alignment pin 86 projecting from the adjacent broad side 31 of the first ring 22. The pins 84 and 86, received, as they are, in the sockets 80 and 82, respectively, rotationally fix the positions of the rings 22 and 26 relative to the center ring 24 so that none of the joints 40a, b and c of ring 22, nor the joints 64 of the ring 26, can align or register with any of the joints 78 of the center ring 24. To permit any of the joints 78 of the center ring 24, to axially register or align with any one or more of the joints 40, 42 of the first ring could undesirably allow some oil on the piston rod 16 to escape scraping by all three scraper edges 32, 50 and 51. To permit any of the joints 64 of the seal ring 26 to register or align with any one or more of the joints 78 of the center ring 24 would undesirably allow gas, as from the cylinder side of the assembly 10, to pass along the piston rod 16 through the joints 64 and 78, and the gap 74 to destroy the gas seal and permit gas to mix with and contaminate oil and to escape the compressor to ambient atmosphere.

Figure 8:
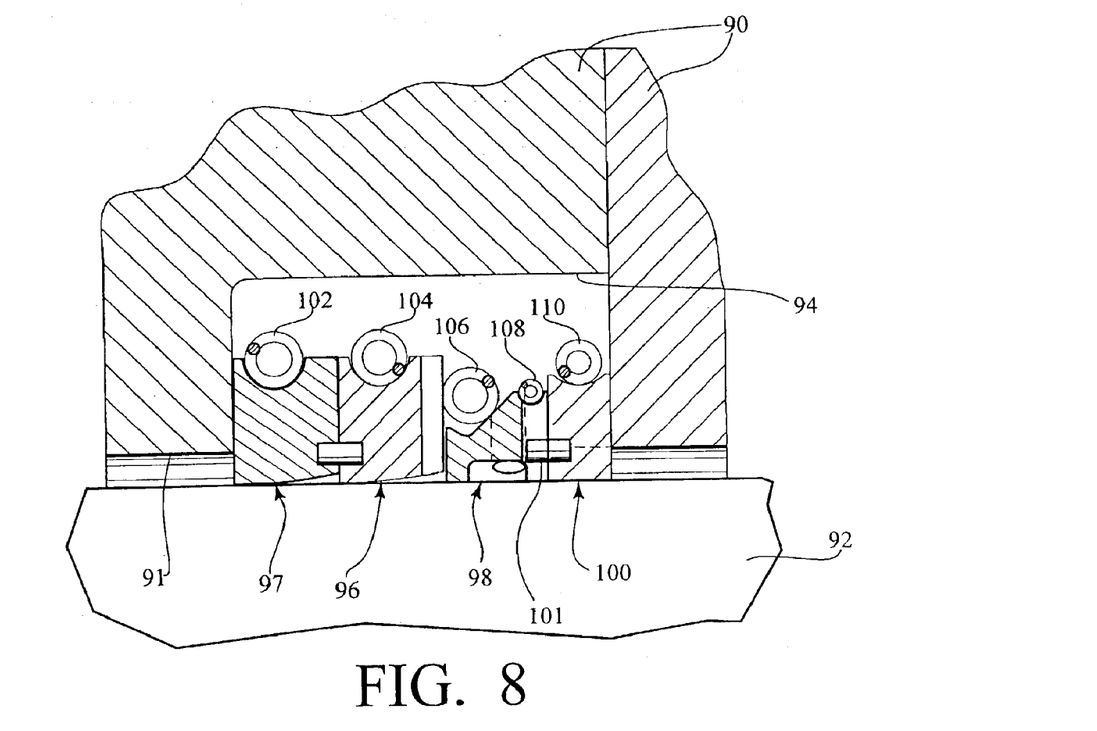
FIG. 8 shows a radial cross section view of a portion of a packing cup having a ring retaining groove containing a novel oil scraper/gas seal ring assembly, thus illustrating another important embodiment of the invention.

FIG. 8 shows a packing cup 90 stationarily mounted over and around a compressor piston rod 92 having a groove 94 containing a first oil scraper ring 96, a center oil scraper ring 98 and a gas seal ring 100. These rings 96, 98 and 100 may be identical in structure and function to the rings 22, 24 and 26, respectively, of the previous example, as shown in FIGS. 1–2. But, due to cup groove 94 being substantially wider than the groove 12 of the previous example, a second oil scraper ring 97, identical to the first ring 96, may be added to the combination between the first ring and an adjacent sidewall of the groove 94 to take up the additional space, so long as a suitable thermal expansion gap can be obtained between the first ring 96 and the center ring 98 in the same manner as obtained in the previous example. Garter springs 102, 104, 106, 108 and 110 provide entirely for compression of the rings 96, 97, 98 and 100 on the rod 92 so that these rings not be dependent upon high gas pressure in the groove 94 in order to function. Also, as in the previous example, the assembly side loading element or spring 106 urges the center ring 98 against the seal ring 100 in a substantially gas tight manner and urges the seal ring 100 against an adjacent sidewall of the groove 94, also in a substantially gas tight manner.

Figure 9:
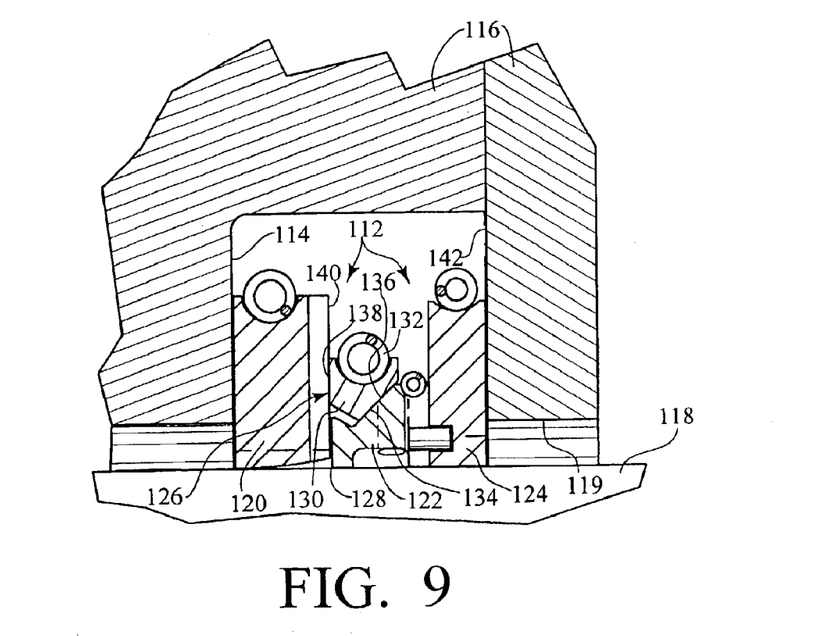
FIG. 9 shows a radial cross-section view of a packing cup containing a novel oil scraper/gas seal ring assembly, thus illustrating yet another important embodiment of the invention.

Referring now to FIG. 9 there is shown, in another important embodiment of the invention an oil scraper ring/gas seal ring assembly, generally designated 112, disposed in a groove 114 of a conventional gas compressor packing cup 116. The cup 116 is stationarily mounted over and around a reciprocal piston rod 118 of a gas compressor, the cup having a bore 119 of sufficient diameter to permit the rod to reciprocate therein without making contact. The assembly 112 includes a first oil scraper ring 120 disposed in the groove 114 on an oil crankcase facing side thereof, the left side as viewed. The assembly also includes a center oil scraper ring 122 disposed next to the first ring 120 and a gas seal ring 124 disposed next to the center ring on a compressor side of the groove 114, the right side as viewed. The rings 120, 122 and 124 may be identical to the rings 22, 24 and 26, respectively, of the original example.

In the present example, a side loading element, generally designated 126, is employed to form and maintain a thermal expansion gap 128 between the first ring 120 and the center ring 122. The element 126 includes an annular and compressible side loading ring 130 and a garter spring 132. The ring 130 includes a diagonally extending inner surface portion 134 which slidably conforms to and bears against a diagonal, extending outer peripheral surface 136 of the center ring 122. A Side 138 of the ring 130 bears flush against an adjacent side 140 of the first ring 120. The ring 130 is therefore disposed in radially inward compression in a peripherally extending wedge shaped slot formed between the surface 136 and the first side ring 140. In addition to formation and maintenance of the gap 128, the element 126 forces the center ring 122 against the seal ring 124 to provide an effective gas tight seal between adjacent sides of these rings and forces the seal ring against an adjacent wall 142 of the groove 114 to provide an effective gas tight seal between those opposing surfaces, as in the previous examples. Thus, the side loading element 126 of the present example functions in a manner similar to the side loading element, i.e. the garter spring 66 of the example, as shown in FIG. 1.

Although the present invention has been explained with respect to specific details of a certain preferred embodiment thereof, it is not intended that such details limit the scope or coverage of this patent other than as expressly set forth in the following claims, taking into consideration all equivalent structures.

We claim:

1. An oil scraper ring/gas seat ring assembly for disposition in a groove formed in a packing cup which is adapted for stationary mounting over and around a reciprocally mounted piston rod of a gas compressor, said assembly comprising a first annular oil scraper ring for mounting in compression around and against the rod in a first side portion of the groove for scraping oil from the rod as the rod moves in one direction;

an annular center oil scraper ring for mounting in compression around and against the rod in a central portion of the groove adjacent said first ring for scraping oil from the rod missed by said first ring as the rod moves in said one direction, said center ring having a diagonally tapered outer peripheral surface portion forming a wedge shaped slot in combination with an adjacent side of said first ring;

an annular gas seal ring for mounting in compression around and against the rod in a second side portion of the groove adjacent said center ring for preventing a gas from leaking between the rod and a bore of said seal ring; and an annular side loading element disposed in compression in said slot and bearing against said tapered surface portion and the adjacent side of said first ring for driving said first ring and said center ring axially apart in the groove to form a thermal expansion gap between them for axial expansion of said rings as their temperature increases, for providing a gas tight seal between opposing sides of said center ring and said seal ring and for driving said seal ring against an adjacent side of said groove to prevent a gas from leaking between opposing sides of said seal ring and the groove.

2. The assembly of claim 1 wherein said first ring includes a first oil scraper edge formed on a first broad side of said first ring for bearing on and around the rod at a first position adjacent said groove first side portion.

3. The assembly of claim 1 wherein said first ring includes a first oil scraper edge formed on a first broad side of said first ring for bearing on and around the rod at a first position adjacent said groove first side portion, said first ring defining an axially extending, circular arc shaped profiled bore extending axially from said first edge in constantly increasing diameter to an opening on a second broad side of said first ring.

4. The assembly of claim 1 wherein said first ring defines a series of rotationally spaced apart, radially extending oil drain channels formed in a surface portion of a broad side of the first ring which faces in a direction opposite said groove first side portion, for receiving oil scraped from said rod by said center ring at a second position.

5. The assembly of claim 1 wherein said first ring includes a second garter spring mounted in compression about an outer peripheral surface thereof.

6. The assembly of claim 1 wherein said first ring comprises a series of arc shaped segments, adjacent end portions of said segments each forming a butt/tangent joint.

7. The assembly of claim 1 wherein said center ring comprises a pair of axially spaced apart oil scraper legs for bearing upon and around the rod, said legs being axially separated by a recess, a first of said legs including a second oil scraper edge on a first broad side of said center ring which opposes said first ring for scraping oil from the rod at said second position, a second of said legs being adapted to form a substantially gas tight seal between a bore thereof and the rod and including a third oil scraper edge for scraping oil from the rod at said third position and for discharging it into said recess, said center ring defining a plurality of oil drain passageways for carrying oil from said recess to an outer periphery thereof.

8. The assembly of claim 1 wherein said center ring defines a generally V-shaped notch formed in an outer peripheral surface thereof in which said side loading element-can rest when said center ring is separated from said first ring, said diagonally tapered surface portion forming one side of said notch.

9. The assembly of claim 1 wherein said center ring further comprises a generally V-shaped notch formed in an outer peripheral surface thereof, said notch having unequal lengths of diagonally extending arms, a short one of said arms extending radially inwardly and axially from a first broadside of said center ring which opposes said first ring to a first intersection with said diagonally tapered portion, said tapered portion of which extends from said first intersection radially outwardly and axially to a second intersection with a generally constant diameter outer surface portion, said constant diameter portion extending axially from said second intersection to a second broad side of said center ring and having a surface region which is suitably grooved for carrying a third garter spring, said center ring including a third garter spring mounted in compression on and around the suitably grooved surface region of said constant diameter portion to operate in combination with said side loading element to prevent rocking motion of said center ring on the rod.

10. The assembly of claim 1 wherein said center ring further comprises a first scraper leg and an axially spaced apart second scraper leg adapted to bear upon the rod, said first leg and said second leg being separated by a circumferentially extending recess, said first leg containing a second oil scraper edge for scraping oil from the rod at a second position adjacent said first ring and for discharging it into the channels of said first ring, said second leg being adapted to form a substantially gas tight seal between a bore thereof and the rod and containing a third oil scraper edge for scraping oil from the rod at said third position adjacent said recess and for discharging it into said recess, said center ring also including a series of rotationally spaced apart oil drain passageways for carrying oil from said recess to said outer peripheral surface portion.

11. The assembly of claim 1 wherein said center ring comprises a series of arc shaped segments, adjacent end portions of which each meet to form a butt joint.

12. The assembly of claim 1 wherein each of said rings is formed of a plurality of arc shaped segments, adjacent end portions of the segments of said first ring and of said seal ring each meeting to form a butt/tangent joint, adjacent ends of the segments of said center ring each meeting to form a butt-joint, said rings being rotationally fixed relative to one another so as to maintain a stationary relationship between said center ring and said first ring, rotationally, and between said center ring and said seal ring, rotationally, to prevent any of the joints of said first ring and of said seal ring from registering and communicating with the joints of said center ring.

13. The assembly of claim 1 further comprising a packing cup for stationary mounting over and around the reciprocally movable piston rod, said cup containing a radially inwardly opening circumferentially extending groove, said rings being disposed in said groove, a sum of axial dimensions of each of said rings being less at a maximum operating temperature of said rings than is the axial dimension of said groove for permitting said side loading element to force said first ring and said center ring axially apart to form said gap between said first ring and said center ring and for providing an effective gas tight seat between said center ring and said seal ring and between said seal ring and an adjacent sidewall of the groove.

14. The assembly of claim 1 wherein said gap has an axial dimension of from about 0.003 inches to about 0.009 inches at standard room temperature for permitting thermal expansion of said rings in said groove as the operating temperature of said rings rise to a maximum operating temperature level without said rings becoming locked together between the first side portion and a second side portion of the groove for preventing a reduction in operative effectiveness of any one of said rings.

15. The assembly of claim 1 further comprising a second oil scraper ring for mounting in compression around and against the rod and disposed between said first ring and an adjacent sidewall of the groove for scraping oil from the rod as the rod moves in said one direction.

16. The assembly of claim 1 wherein said seal ring comprises a series of arc shaped segments, adjacent end portions of which segments each meet to form a butt/tangent joint.

17. The assembly of claim 1 wherein said side loading element comprises a first garter spring.

18. The assembly of claim 1 wherein said side loading element comprises a compressible side loading ring and a garter spring mounted over and around a radially outer periphery of said side loading ring.

19. The assembly of claim 6 wherein said series is three.

20. The assembly of claim 11 wherein said series is three.

21. The assembly of claim 16 wherein said series is three.

22. The assembly of claim 18 wherein said side loading ring defines a radially inwardly facing tapered surface portion which slidably bears flush against the tapered surface portion of said center ring.

23. An oil scraper ring/gas seal ring assembly for disposition in a single groove formed in a packing cup which is adapted for stationary mounting over and around a reciprocally movable piston rod, said assembly comprising a first oil scraper ring for mounting in compression around and against the rod in a first side portion of the groove and including a first oil scraper edge for scraping oil from the rod at a first position in line with a first sidewall of the groove as the rod advances in said first ring and for discharging it away from the groove and cup;

a center oil scraper ring for mounting in compression around and against the rod in a central portion of the groove adjacent said first ring for scraping oil from the rod at a second position and an axially spaced apart third position as the rod advances in said center ring, said center ring having a diagonally tapered radially outer peripheral surface portion forming a radially outwardly opening wedge shaped slot in combination with an adjacent side of said first ring;

a seal ring for mounting in compression around and against the rod in a second side portion of the groove adjacent said center ring for preventing a gas from leaking between the rod and a bore of the seal ring; and a side loading element mounted in compression in said slot between and against said first ring and said tapered surface portion for forcing said first ring and said center ring axially apart to form a thermal expansion gap between them at a maximum operating temperature of said rings, for forcing said center ring against said seal ring to provide a substantially gas tight seal between opposing sides of said center ring and said seal ring and for forcing said seal ring against a second sidewall of the groove for preventing a gas from leaking between said second sidewall and an adjacent side of said seal ring.

24. An oil scraper ring/gas seal ring assembly for disposition in a single groove formed in a packing cup which is adapted for stationary mounting over and around a reciprocally movable piston rod, said assembly comprising a first oil scraper ring for mounting in compression around and against the rod in a first side portion of the groove, for scraping oil from the rod at a first position before it can enter the groove as the rod advances in said first ring and for discharging it away from the groove and cup;

a center oil scraper ring for mounting in compression around and against the rod in a central portion of the groove adjacent said first ring for scraping oil from the rod at second and third axially spaced apart positions, said center ring having a diagonally tapered outer peripheral surface portion which forms a circumferentially extending, radially outwardly opening wedge shaped slot in combination with an adjacent side of said first ring;

a seal ring for mounting in compression around and against the rod in a second side portion of the groove adjacent said center ring for preventing a gas from leaking between the rod and a bore of the seal ring; and a side loading element mounted in compression in said slot for forcing said first ring and said center ring axially apart to form a thermal expansion gap between said first ring and said center ring, for forcing said center ring against said seal ring to provide a substantially gas tight seal between opposing sides of said center ring and said seal ring and for forcing said first ring against a first sidewall of the groove and for forcing said seal ring against a second sidewall of the groove for preventing a gas from leaking between said second sidewall and an opposing broad side of said seal ring.

25. An oil scraper ring/gas seal ring assembly for disposition in a single groove formed in a packing cup adapted for stationary mounting over and around a reciprocally movable piston rod of a gas compressor, said assembly comprising a first oil scraper ring for disposition in compression around and against the rod in a first side portion of the groove, for scraping oil on a first broad side thereof from the rod at a first position aligned with a first side of the groove before it can enter the groove and for discharging it away from the groove and cup, the first ring including a series of oil drain channels formed on a surface portion of a second broad side thereof;

a center ring for disposition in compression around and against the, rod in a central portion of the groove adjacent said first ring for scraping oil from the rod at a second position for discharging it into the channels of said first ring and for scraping oil from the rod at a third position and for discharging it into a recess formed axially between and separating said second position from said third position, said center ring defining a series of oil drain passageways for draining oil from said recess to an outer periphery thereof, said center ring including a circumferentially extending, diagonally tapered outer peripheral surface portion which forms a wedge shaped slot in combination with said second broad side of said first ring;

a gas seal ring for disposition in compression around and against the rod in a second side portion of the groove next to said center ring for preventing gas from leaking between the rod and said seal ring; and a side loading element disposed in compression in said slot for providing opposite, axially directed-forces against said first ring for urging said center ring away from said first ring and against said seal ring for providing a thermal expansion gap between said first ring and said center ring, for providing a substantially gas tight seal between opposing surfaces of said center ring and said seal ring and for providing a substantially gas fight seal between opposing sides of said seal ring and the groove.

26. An oil scraper ring/gas seal ring assembly for disposition in a ring retaining groove of a packing cup which is mounted on a piston rod of a gas compressor, said assembly comprising a first oil scraper ring having a profiled central bore for disposition in and on first side portion of the groove, said first ring having a first oil scraper edge on one side thereof for scraping oil from the piston rod at one side of the groove before it can enter the groove, said first ring including a plurality of rotationally spaced apart, radially extending oil drain channels formed in a broad surface portion thereof which is opposite the side containing said first scraper edge, said first ring comprising a series of arc shaped segments, adjacent ones of said segments each meeting to form a butt/tangent joint with a butt portion of each of said joints opening onto a different one of said oil drain channels;

a first garter spring mounted over an outer periphery of said first ring for urging said first scraper edge against the piston rod;

a gas seal ring for disposition in and on a second side portion of the groove;

a second garter spring mounted over an outer periphery of said seal ring for compressing said seal ring upon the piston rod for preventing gas from leaking between the piston rod and said seal ring;

a center oil scraper ring for disposition in and on a central portion of the groove between said first ring and said seal ring and including a pair of axially spaced apart oil scraper legs separated by a circumferentially extending recess, a first of said legs having a second oil scraper edge for scraping oil from the piston rod into the oil drain channels of said first ring, a second of said legs having a third oil scraper edge for scraping oil from the piston rod into said recess, said center ring defining a group of rotationally spaced apart oil drain passageways extending radially between said recess and an outer periphery of said center ring for carrying away oil scraped by said third scraper edge, an outer periphery of said center ring including a diagonally extending portion which is generally in registry with said recess and a generally constant diameter portion adjoining said diagonally extending portion which is generally in registry with the second of said legs, said center ring comprising a group of arc shaped segments, adjacent ones of said segments each meeting to form a butt joint;

a third garter spring mounted over said diagonally extending portion for radially compressing said center ring against the piston rod, said third spring being movably wedged between said first ring and said diagonally extending portion for axially urging said first ring against a first side of the groove while axially repelling said center ring away from said first ring and for axially urging said center ring against said seal ring to force said seal ring against a second side of the groove, the combined axial dimension of said first ring, said center ring and said seal ring being less than the axial dimension of the groove when said rings are operating at a maximum temperature;

a fourth garter spring mounted over said disc shaped portion for compressing the second of said legs against the piston rod and for acting in combination with said third garter spring for preventing rocking movement of said center ring; and means for rotationally stabilizing said center ring relative to said first ring and said seal ring to prevent any of the butt portions of the joints of the first ring and of the seat ring from aligning and communicating with the joints of said center ring.

27. An oil scraper ring/gas seal ring assembly for disposition in a ring groove formed in a bore of a packing cup mounted on a piston rod of a gas compressor between a crankcase of a prime mover of the piston rod and a cylinder of the compressor, said assembly comprising a first oil scraper ring having a profiled bore and a radially inner side scraper adjacent said crankcase for scraping oil from said piston rod back to said crankcase, said first ring including a series of rotationally spaced apart, radially extending oil drain channels formed on a side which faces away from said crankcase, said first ring being formed of a plurality of arc shaped segments, adjacent each meeting to form a butt/tangent joint;

a first garter spring disposed about the periphery of said first ring for urging said side scraper edge against said piston rod;

a gas seal ring disposed next to said cylinder for preventing gas from said cylinder from mixing with oil from said crankcase, said seal ring including a group of arc shaped segments, adjacent pairs of said seal ring segments each meeting to form a but/tangent joint;

a second garter spring disposed about the periphery of said seal ring for urging said seal ring against said piston rod;

a central oil scraper ring disposed between said first ring and said seal ring having a first oil scraper leg on a first side which is adjacent said first ring, for scraping oil form said piston rod into said oil drain channels, and a second oil scraper leg on second side which is axially spaced from said first scraper leg by a circumferentially extending recess and which is adjacent said seal ring, for scraping oil from said piston rod into said recess, said central ring defining a generally V-shaped notched portion in a radially outer periphery thereof, a base leg of said notch extending diagonally inwardly and axially away from said first ring across and spaced radially outwardly from said first scraper leg, an adjacent leg of said notch extending diagonally outwardly and axially away from said base leg across and radially outwardly spaced from said recess, said adjacent leg terminating in an essentially constant radius outer peripheral surface portion extending across and radially outwardly spaced from said second scraper leg, said central ring including a quantity of arc shaped segments, adjacent ends of said central ring segments each meeting to form a butt joint, the rotational orientation of said central ring relative to said first ring and said seal ring being fixed and being such that no butt joint of said central ring registers with any portion of any butt/tangent joint of said first ring and said seal ring;

a third garter spring disposed about the notched portion of outer periphery of said central ring for urging said first and second scraper legs radially against said piston rod and for creating axial loading on said assembly having the effect of repelling said first ring axially away from said center ring and of forcing said center ring axially against said seal ring; and a fourth garter spring mounted over the outer peripheral surface portion extending across said second scraper leg for urging said second scraper leg against said piston rod and for preventing rocking movement of said central ring, each of said center ring segments defining an array of oil drain passageways extending in rotationally spaced apart relationship between said recess and said notched portion between said third garter spring and said fourth garter spring.

* * * * *